United States Patent Office 3,092,444
Patented June 4, 1963

3,092,444
PROCESS FOR REMOVING ACETYLENE FROM GASES
Johann G. E. Cohn, West Orange, and Alfred J. Haley, Jr., Colonia, N.J., assignors to Engelhard Industries, Inc., Newark, N.J., a corporation of Delaware
No Drawing. Filed Aug. 12, 1960, Ser. No. 49,118
1 Claim. (Cl. 23—2)

This invention relates to a process for effecting combustion reactions of oxygen-containing gases and more particularly relates to specific fuel-catalyst combinations which afford low ignition or kindling temperatures of specific fuels in admixture with oxygen-containing gases.

This application is a continuation-in-part of our prior co-pending application Serial No. 650,863, filed April 5, 1957, now abandoned.

Two broad types of applications are of special importance in connection with the catalytic combustion reactions. In the first case, the catalytic reaction of fuel and oxygen is conducted with the fuel present in an amount stoichiometrically equivalent to or greater than the oxygen content. A typical example would be a process in which it was desired to remove all of the oxygen from a gas stream and in this case a slight fuel excess would be required. Specifically, for a stream containing, by volume, 3.5 percent oxygen and 96.5 percent nitrogen, it would be necessary to use at least 1 percent by volume of ethane, for example. In industrial uses, reactions in this category may have the objective of producing heat as well as removing oxygen.

In the second case, the catalytic fuel-oxygen reaction is conducted with the oxygen present in excess over the fuel, and an example of this type of process is one in which undesirable hydrocarbons are removed from air streams. In a specific case in the production of liquid air, it is necessary to remove small amounts of acetylene from the air stream in order to prevent condensation of solid acetylene in cold portions of the equipment, resulting in serious explosion hazards.

Another way of differentiating between the two types of processes is that in one case purification of gas streams from oxygen is the objective, and in the other the objective is to purify gas streams from hydrocarbons.

In accordance with the present invention, the oxygen of the oxygen-containing gas is reacted with acetylene fuel at an ignition temperature not higher than about 160° C. in contact with a catalyst of the group consisting of rhodium and ruthenium metal catalysts. The preferred ignition temperature for the reaction is not higher than about 40° C., and is achieved when rhodium metal catalyst, the preferred catalyst, is employed and the oxygen is present in concentration greater than the stoichiometric amount required for complete reaction with the acetylene. The reaction is effected by contacting an admixture of the oxygen-containing gas and acetylene with the catalyst at the temperature specified.

Ignition temperatures not higher than about 160° C. are employed in the instant process utilizing the catalyst specified to avoid unnecessary and prolonged exposure of the catalyst to high temperatures, which may result in detrimental effects to the catalyst and impairment of its catalytic activity. The reaction of the oxygen with acetylene is an exothermic one and prolonged exposure of the catalyst to temperatures of about 700° C. or higher should be avoided. With the catalysts of this invention it is possible to provide feed to the catalysts at a lower ignition temperature than heretofore known, so that for a given mixture of oxygen-containing gas and fuel with a given $\Delta T$ of reaction the final reaction temperature is lower. It is also possible in accordance with this invention to supply a larger amount of the minor ingredient of the reaction (and thus react a greater amount of such ingredient with the result of a higher $\Delta T$) without heating the catalyst to the extent of damaging it. Ignition temperatures not higher than about 40° C. (when the oxygen is present in stoichiometric excess) are preferred for the same reasons.

The catalyst may be supported on suitable supports such as alumina including activated alumina, silica, silica gel, diatomaceous earth and other similar catalytic supports. Use of activated alumina supports gave excellent results.

For optimum conversion, the catalyst metal should be present within the range of about 0.1–2 percent or more by weight of the catalyst metal and support, and the catalyst may be in the form of pellets, granules, or powder. The supported catalyst may be prepared in any suitable manner, i.e. by treating the carrier or support with a solution of a suitable metal compound and then reducing the metal compound to metal.

The fuel for which the rhodium or ruthenium catalyst has been found to be efficacious in burning at a low ignition temperature is acetylene, and this fuel may contain water vapor up to 5 volume percent, or more. At water vapor concentrations of about 2 percent by volume, there is in some cases a slight increase in the temperature required for ignition.

The space velocity may be in the range of about 10,000 to 200,000 standard volumes of gas per volume of catalyst per hour, and a space velocity in the range of about 50,000 to 200,000 standard volumes per volume per hour is of industrial importance. The pressure may be in the range of atmospheric to about 500 p.s.i.g. or higher. The process may be conducted in two stages if desired, with intermediate cooling between stages in a manner similar to that disclosed in co-pending application Serial No. 650,860, filed April 5, 1957, now Patent No. 2,970,034.

Examples of oxygen-containing gases or gas which can be reacted with the hydrocarbon fuel in accordance with the invention include atmospheric air, mixture of oxygen and nitrogen, e.g. mixture containing by volume, 3,5 percent oxygen and 96.5 percent nitrogen, oxygen-enriched air, and waste gases containing oxygen and oxides of nitrogen from the ammonia oxidation process. The normal precaution should be taken to avoid producing an explosive mixture of the oxygen-containing gas and the fuel.

The invention will be further illustrated by reference to the following specific example.

EXAMPLE I

A series of runs was made to study the effectiveness of various specific catalysts with an acetylene fuel, and the procedure consisted of passing a mixture of acetylene fuel and an oxygen-nitrogen mixture over the catalyst to be evaluated. During the period of gas flow, the temperature of the catalyst was gradually raised and for each catalyst the temperature was determined at which it began to promote combustion. Once this ignition point was reached, the heat liberated by the combustion reaction raised the temperature of the gas, and the final temperature is the result of the heat of the combustion, the heat capacity of the gaseous products after combustion, and the heat losses in the reactor system. For the purpose of the present invention, only the ignition temperature is of interest and this temperature may also be termed the kindling or take-off temperature.

In Table I below are listed the ignition temperatures for various combinations of acetylene fuel, oxygen-containing gases, and catalysts, and these ignition temperatures are to some extent a function of the reactor system employed, i.e. with the relatively low gas flows employed there was a considerable heat loss effect which would not be observed with large gas flows. Generally, the ignition temperatures observed under conditions of large gas flows under essentially adiabatic conditions are lower than those shown in the table. However, this effect does not alter the relative scale of catalyst activity shown in the table.

In Table I below, two sets of ignition temperatures are listed for the acetylene, "A" being the ignition temperature of a mixture containing 3 percent oxygen by volume and a stoichiometrically equivalent amount of acetylene with the balance being nitrogen, and "B" being the ignition temperature of a mixture of air and acetylene equivalent to 3 percent by volume of oxygen. The "A" condition is one in which the oxygen and hydrocarbon are in exact balance, i.e. the atmospheric surrounding the catalyst is neutral insofar as oxidation is concerned, while the "B" condition is for a gaseous mixture in which the oxygen is present in a concentration seven times as great as the hydrocarbon. This distinction is of considerable importance in different applications of this invention to the treatment of specific gas streams.

The results are as follows:

*Table I*

IGNITION TEMPERATURE OF ACETYLENE-OXYGEN-NITROGEN MIXTURES OVER VARIOUS CATALYSTS

Total flow rate=10 ft.$^3$ per hr. at 1 atmosphere pressure using 2.5 gm. catalyst. T° C.=minimum temperature required to sustain reaction. [Catalyst support=⅛" activated alumina pellets.]

| Catalyst | $C_2H_2$ | |
|---|---|---|
| | A<br>Ignition temperature of mixture containing 3% $O_2$, stoichiometric equivalent of hydrocarbon, balance nitrogen, ° C. | B<br>Ignition temperature of mixture of air and hydrocarbon equivalent to 3% oxygen, ° C. |
| 0.5% Pt on $Al_2O_3$ | 325 | 145 |
| 0.5% Pd on $Al_2O_3$ | 270 | 180 |
| 0.5% Ru on $Al_2O_3$ | 160 | 150 |
| 0.5% Rh on $Al_2O_3$ | 120 | 40 |

From above the table it will be seen that where acetylene is used as the fuel, the best catalyst is rhodium with ruthenium also being efficacious.

It will be obvious to those skilled in the art that many modifications may be made within the scope of the present invention without departing from the spirit thereof, and the invention includes all such modifications.

What is claimed is:

A process for effecting the removal of acetylene from a gas mixture containing oxygen and nitrogen in addition to the acetylene, the oxygen of the gas mixture being present in amount greater than the stoichiometric quantity required for reaction with the acetylene, which comprises passing the gas mixture into contact with a rhodium metal catalyst at an ignition temperature of said admixture of about 40° C. thereby effecting reaction of the oxygen with the acetylene whereby the acetylene is removed from the gas mixture.

References Cited in the file of this patent

UNITED STATES PATENTS 2,910,343     Childers et al.           Oct. 27, 1959

OTHER REFERENCES

Altieri: "Gas Analysis and Testing of Gaseous Materials," published by the American Gas Association, Inc., N.Y., 1st edition, 1945, pages 30 and 31.